United States Patent [19]
Hurcum

[11] 4,438,432
[45] Mar. 20, 1984

[54] INFORMATION DISPLAY APPARATUS

[75] Inventor: Ivan B. Hurcum, Chippenham, England

[73] Assignee: Westinghouse Brake and Signal Company Limited, England

[21] Appl. No.: 220,894

[22] Filed: Dec. 29, 1980

[30] Foreign Application Priority Data

Jan. 19, 1980 [GB] United Kingdom ............... 8001871

[51] Int. Cl.³ ............................................. H04Q 9/00
[52] U.S. Cl. .......................... 340/825.35; 340/286 M; 340/825.53; 340/717; 370/43; 370/86; 179/18 DA; 179/99 R
[58] Field of Search ............ 179/18 DA, 18 ES, 18 B, 179/90 B, 81 R, 99 R; 370/43, 86; 340/825.34, 825.35, 286 M, 825.53, 717

[56] References Cited

U.S. PATENT DOCUMENTS

| | | | |
|---|---|---|---|
| 2,764,751 | 9/1956 | Gnadke | 340/286 M |
| 3,500,327 | 3/1970 | Belcher et al. | 340/825.27 |
| 3,588,365 | 6/1971 | McNeilly et al. | 179/81 |
| 3,899,774 | 8/1975 | Binnie et al. | 340/825.53 |
| 4,002,886 | 1/1977 | Sundelin | 340/825.35 |
| 4,163,123 | 7/1979 | Brodsky et al. | 370/43 |
| 4,196,316 | 4/1980 | McEowen et al. | 179/99 R |
| 4,225,753 | 9/1980 | Chown et al. | 370/86 |
| 4,232,199 | 11/1980 | Boatwright et al. | 179/18 DA |

*Primary Examiner*—Marshall M. Curtis
*Attorney, Agent, or Firm*—Larson and Taylor

[57] ABSTRACT

A plug-in "universal" information display module for use in an information display system, e.g. a train describer system, of the kind in which all information to be displayed is multiplexed onto a data highway routed to all display locations. The heart of the module is a microprocessor which "listens" to the multiplexed messages on the data highway, selects for decoding only those containing the address of its location and produces a decoded message in the form of a two-dimensional matrix display format suitable for scanning to drive an L.E.D. matrix display panel. An address programming means is connected to an address input to the microprocessor so that a module is normally programmed with a location address at the time of connection to the data highway either by a manual operation or automatically upon mating of the plug connector.

8 Claims, 5 Drawing Figures

INFORMATION DISPLAY APPARATUS

The present invention relates to information display apparatus.

In particular the invention is concerned with apparatus for use in information display systems of the kind in which different information is displayed at a multiplicity of locations, and is transmitted to the display apparatus of each location via a multiplexed link. An example of such a display system in a train describer display.

Train describer displays are mimic diagrams showing the layout of a complete railway route system including all traffic control devices, e.g. signals, points etc., and all track sections, the representations of which may be illuminated in well known manner to show the settings of the control devices and the presence of a train within a track section. In addition display modules are provided to identify a train by means of a code number which follows the progress of a train through the diagram from module to module. The signals to operate the train describer diagram are obtained, either directly of indirectly, from track detection apparatus.

According to the present invention there is provided an information display module for use in an information display system in which information is transmitted by means of coded messages including a location address portion and an information portion over a multiplexed link to a plurality of display module locations comprising, plug-in connector means for connecting the module to the multiplexer link, address programming means for providing the module with a location address, address comparison and information gating means operative to compare the address portions of transmitted messages with the selected location address and when a correct address is detected to gate the information portion of the message to decoding means arranged to control energisation of information display means according to the decoded information to be displayed.

Preferably the address comparison and information gating means and the decoding means comprise a microprocessor.

In order that the invention may be readily understood an embodiment will now be described with reference to the accompanying drawings, in which.

Figure 1:
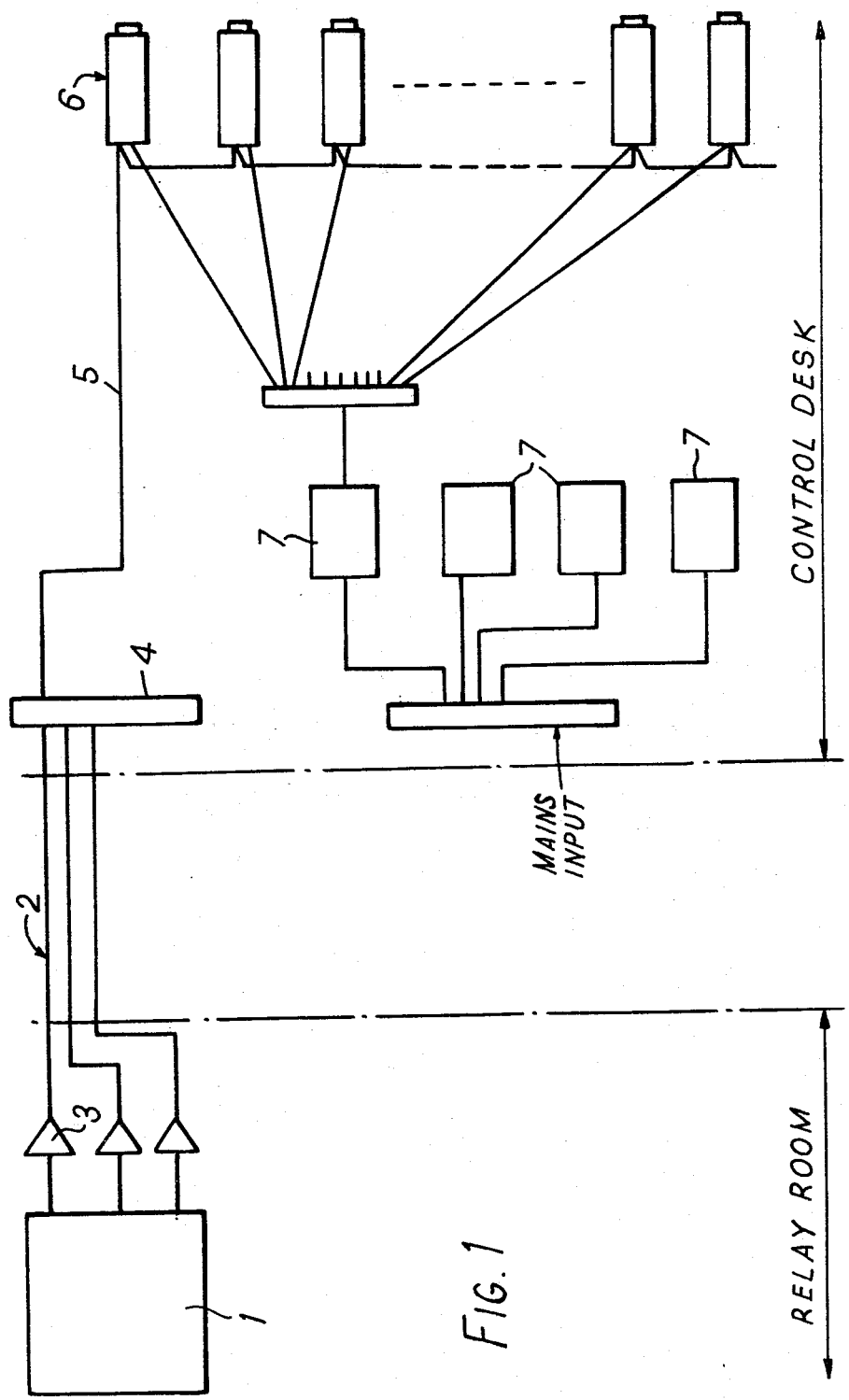
FIG. 1 shows a block diagram of a train describer system.

Referring now to the drawings, and in particular to FIG. 1, there is shown a block diagram of a train describer system from which a representation of the mimic diagram itself is omitted for clarity. The signals which drive the train describer mimic diagram display are derived directly from signals supplied to a computer 1 by track detection apparatus distributed throughout the controlled railway track system, and from a traffic control deck (not shown). In this system, computer 1 is housed in the interlocking relay room and supplies display information for a train describer display via multiplexed links, generally indicated by reference 2, connected through multiplex transmitters 3. A number of such links may be provided between computer 1 and respective sections of the train describer mimic diagram as required, one such section being illustrated in the drawing together with further links which may be connected as required to other sections. As the computer 1 and the diagram may be separated, so that links 2 cover an appreciable distance between the two locations, these are preferably screened cables. In this instance the multiplexed signals are in the form of differential currents carried by a screened "twisted pair" of signal wires.

In the display apparatus room, i.e. the railway control room, the cable screens of links 2 are terminated by connection to a signal distribution terminal strip 4. One of the twisted pair multiplex links 5 is looped from display module to display module, generally indicated at 6, connecting all such display modules in the mimic diagram section in parallel. The modules 6 also receive power, by any convenient connection arrangement (a parallel connection being shown), from a display power supply 7. Further such power supply units 7 may be provided for other sections of the display.

Figure 2:
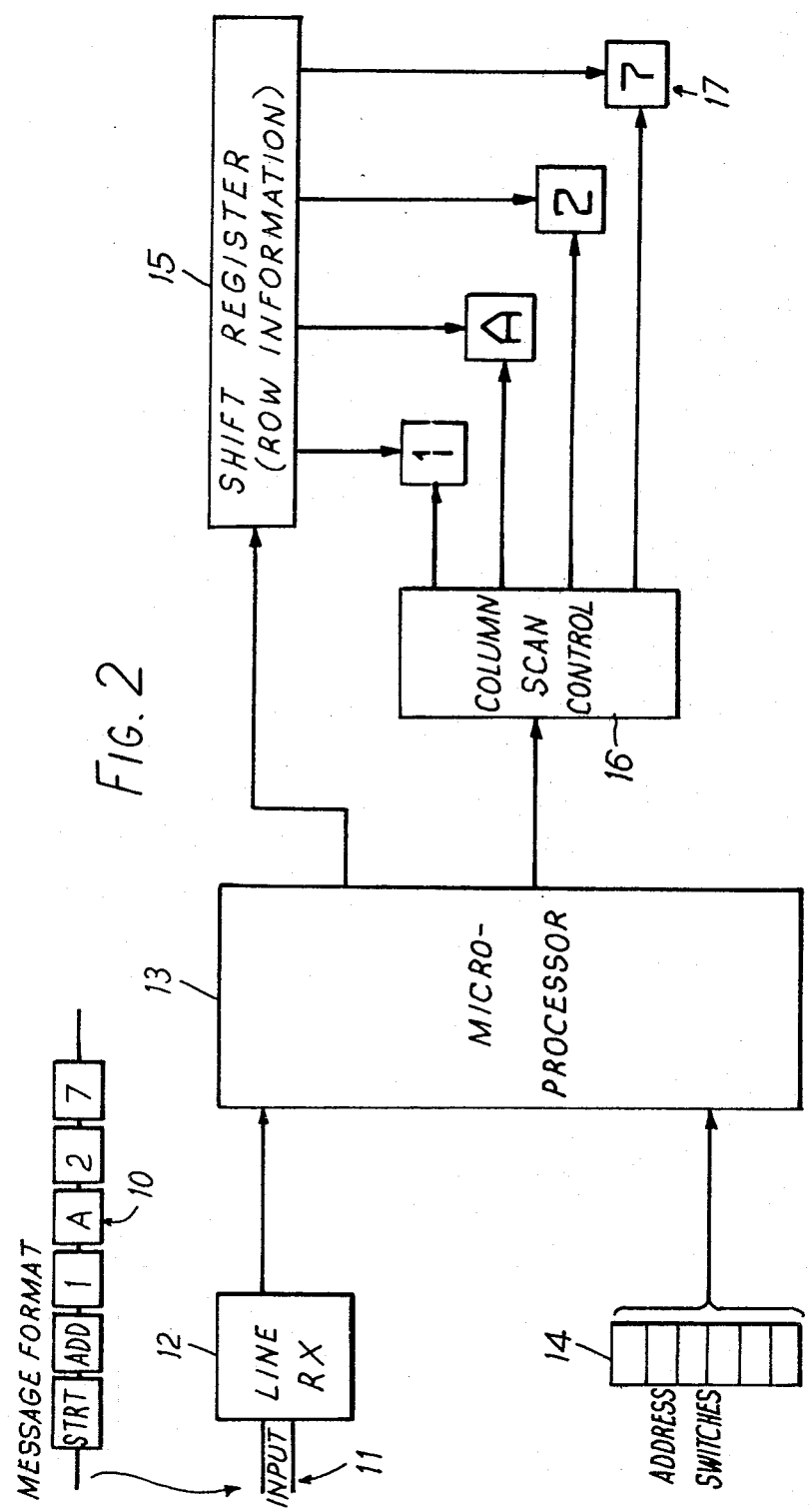
FIG. 2 shows a block diagram of a basic train describer display module.
Figure 5:
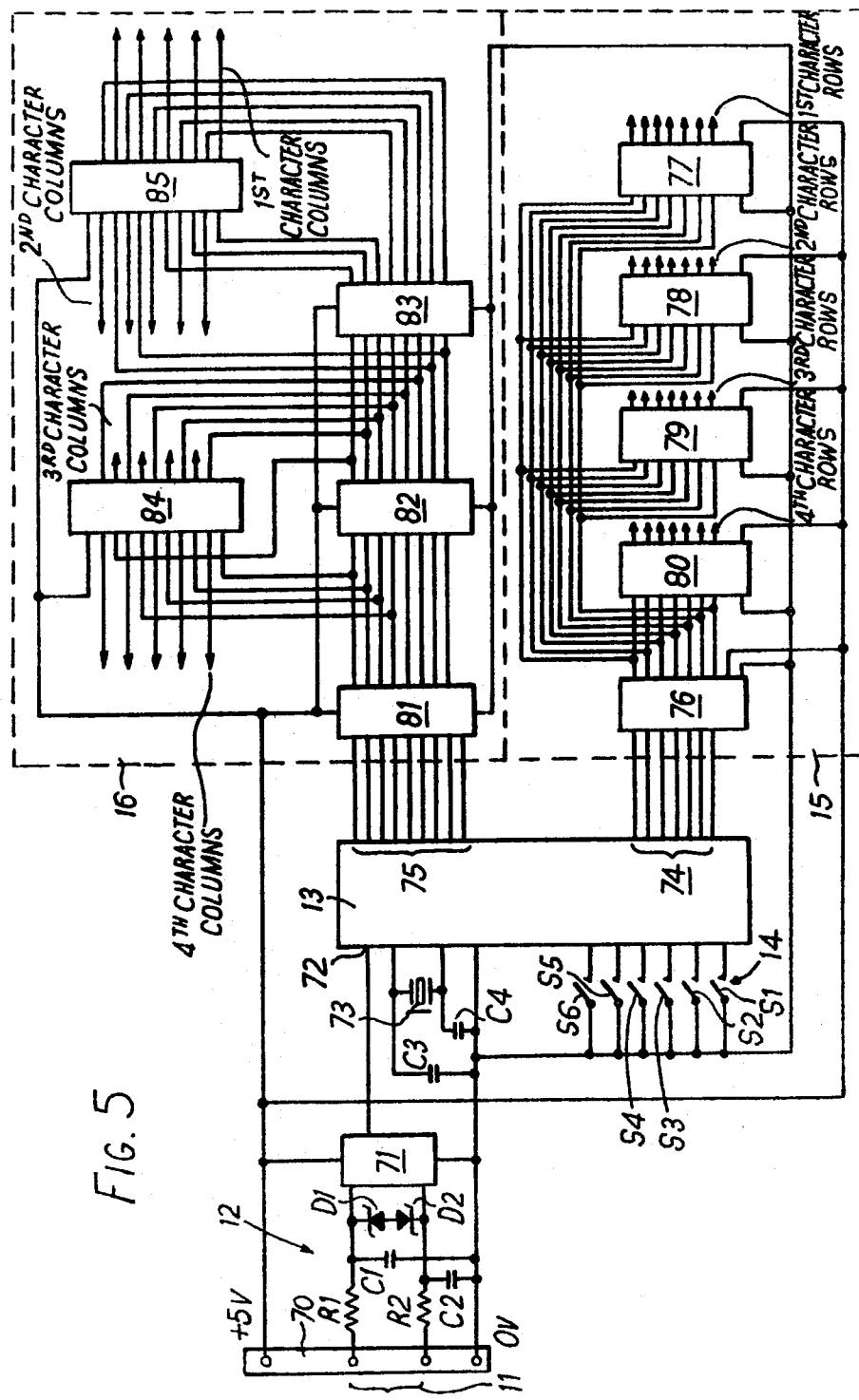
FIG. 5 shows a circuit diagram of the display module.

The basic electrical construction of a display module is shown in FIG. 2 and a more detailed circuit diagram of the same is shown in FIG. 5. Referring now to FIG. 2 the multiplex link 5 carries multiplexed messages having a format represented at 10. Each message comprises a plurality of bytes (e.g. six), each of which consists of a number of coded bits (e.g. twelve). The first byte signifies a start of a message, and serves to synchronise module timing circuits, the second byte contains a module address code, to which only one module is normally programmed to respond, and the remaining four bytes are coded information characters.

The coded message signals are received by a module 6 at differential line input terminals 11 connected to a differential line receiver 12 which converts the multiplexed differential signals to a single-ended logic level output connected to the data input of a microprocessor 13. The module address is set up by a bank of switches 14 connected to an address program input to the microprocessor.

If a received address in a message matches the programmed address the microprocessor 13 decodes the following coded information bytes and generates appropriate signals for row and column scan control circuits 15 and 16 respectively to drive an information display matrix panel 17.

Figure 3:
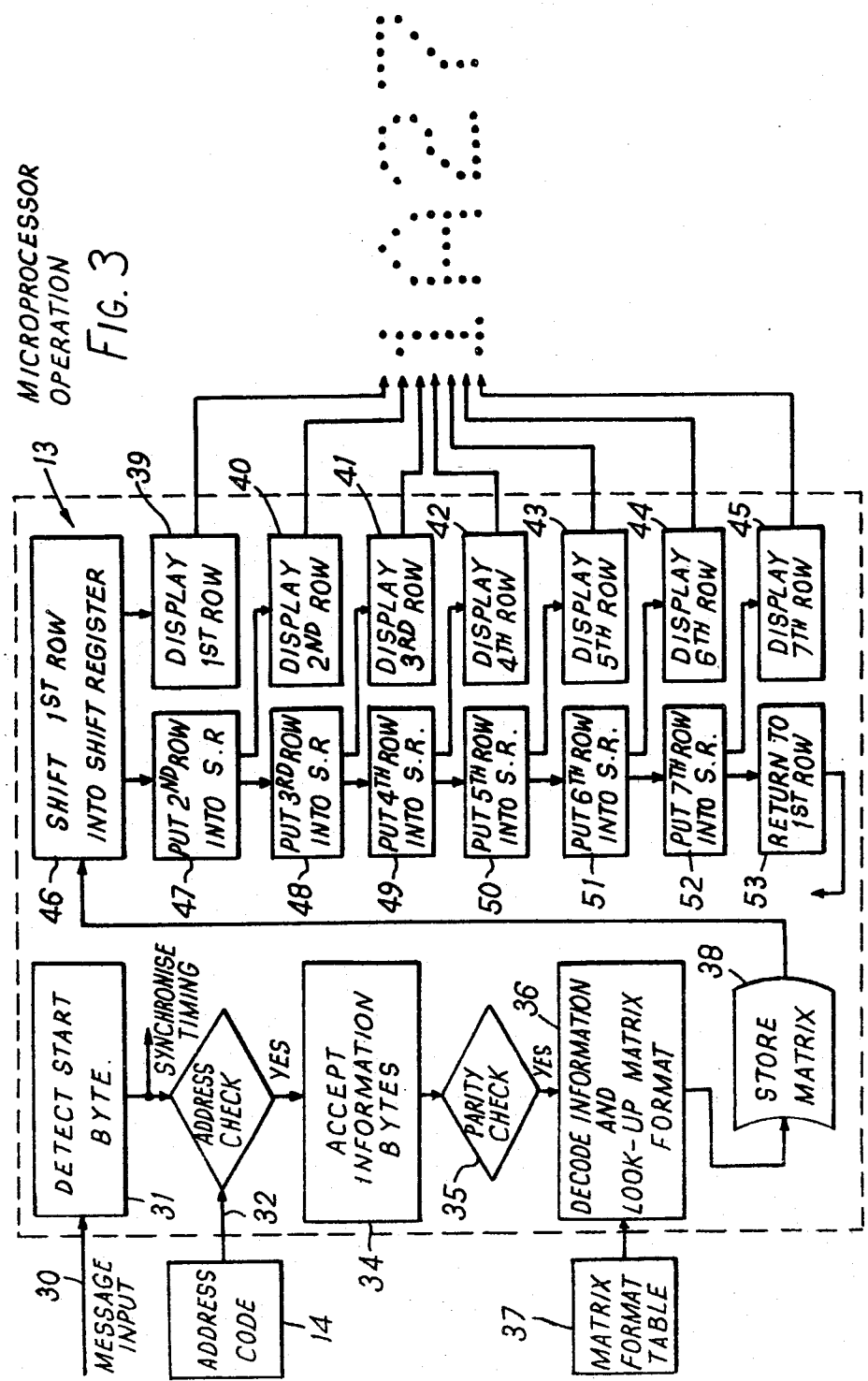
FIG. 3 shows a block diagram illustrating the operational sequence of functions of the microprocessor of the module of FIG. 2.

It will already be apparent that the heart of the display module is microprocessor 13, the operation of which has so far only been described in outline but, which will now be dealt with in detail with reference to the microprocessor function flow chart of FIG. 3. The signals on multiplexed data highway 5 (FIG. 1) are converted to single-ended format and connected to microprocessor 13 at input 30. The first microprocessor operation, function block 31, is synchronisation of the microprocessor timing with the start of a received message. As will be described with reference to FIG. 5 the module circuits include an internal clock arranged to operate the microprocessor at the same bit rate as multiplexed messages thus dispensing with the need for simultaneous transmission of clock signals.

The second function 32 is an address check, the module address is stored in a convenient form e.g. in switch bank 14 permanently connected to microprocessor 13. The address check function controls a gating function giving access for the message information to the remainder of the microprocessor. If a received address does not match the stored address the information bytes are rejected. However, if the addresses match the information bytes are accepted, function 34, and a parity check is made, function 35. Assuming the parity check function 35 shows the information bytes to be uncorrupted by errors the next function 36 is allowed to proceed. In function 36 each information byte is decoded and converted into a digital word corresponding to the dot format of the information character to be displayed. The dot format words for all possible characters are stored in a preprogrammed memory or look-up table 37 and each word is "looked-up" using the coded byte as a memory location address. The dot format information for each of the four information characters is then loaded into a memory store or shift register 38. This stored information is subsequently read-out to drive the matrix display according to a series of scan functions 39 to 53 corresponding to sequential energisation of the rows of display matrix 17.

Figure 4:
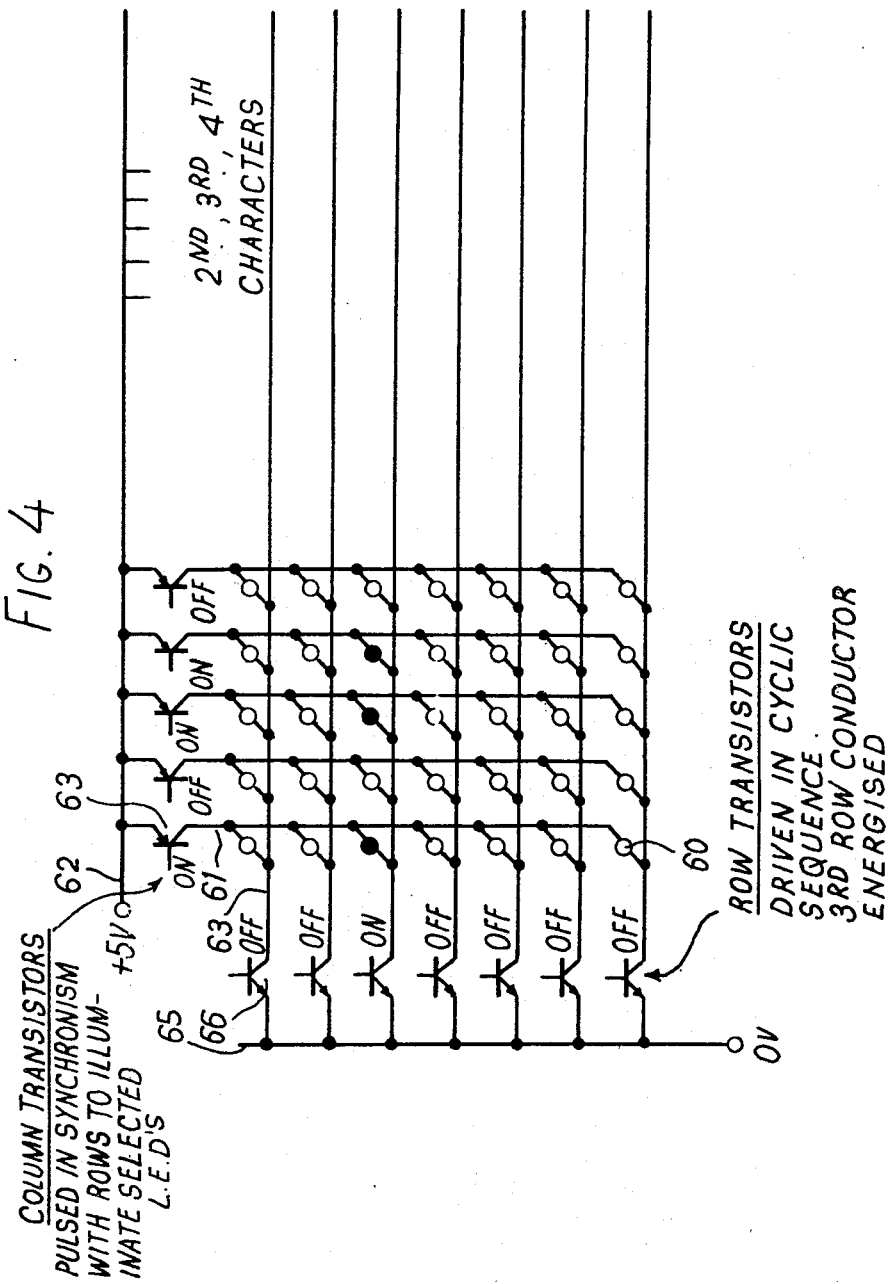
FIG. 4 illustrates part of the display matrix of the module.

The scanning operation, how it may be carried out and the basic construction of the display panel matrix 17 are indicated in FIG. 4. The matrix arrangement for one character is illustrated, each dot in the seven rows by five columns matrix is the location of a light emitting diode (L.E.D.), one of which is indicated by reference 60. In the plane of the drawing there are seven L.E.D.'s in each column and, one terminal of each L.E.D. is conected to a common column conductor 61 which may be selectively connected to a positive five volts supply line 62 by means of a transistor 63. The L.E.D.'s are also arranged in rows of five and the other terminal of each L.E.D. is connected to a common row conductor 64 which may be selectively connected to a zero volt or earth supply line 65 by means of a transistor 66. Thus, an L.E.D. 60 is connected between a row and column conductor at each "intersection" thereof and may be illuminated only by rendering both transistors conducting to produce a potential difference between the respective conductors.

The information stored in microprocessor memory 38 therefore corresponds to the base drive signals required to switch the row and column transistors during a complete display matrix scan sequence. Since, to illuminate the L.E.D. connected at the intersection of a row and columm both said conductors must be energised the transistor base drive signals are inter-laced, as is well-known in scanning techniques. Providing the scan rate is sufficiently high no flicker in the illumination of the L.E.D.'s will be perceived by a human eye and the displayed characters will appear to be constantly illuminated.

Referring now to the display module circuit diagram of FIG. 5, in which parts previously referred to have the same references, all electrical connections to the display module are made through a plug 70 including, as shown, the differential line input terminals 11 and a positive five volts supply (+5 v) and zero volt lines (0 v). The inputs of differential line receiver 12 are connected to terminals 11 by interference filters comprising resistor R1 and capacitor C1 and, resistor R2 and capacitor C2 respectively. Over voltage protection is provided by two back to back zener diodes D1 and D2 each of 6.2 volts operating voltage which limit the differential line voltage to approximately seven volts.

Line receiver 12 includes a standard integrated circuit block 71 designed to convert differential signals to a "single-ended" logic compatible output suitable for direct connection to the data input 72 of microprocessor 13. Timing or clock pulses which govern operation of the microprocessor are generated by means of a crystal oscillator 73 connected between two timing terminals and coupled to earth voltage by capacitors C3 and C4 respectively.

The module address input to microprocessor 13 is provided by a bank of six miniature switches 14. Each switch may be closed to connect an address input terminal on processor 13 to ground or opened in order to simulate a digital '0' or '1' respectively for each bit of a six digit address code.

As previously mentioned, the microprocessor also contains, inter alia, a dot format memory or look-up table (not indicated in FIG. 5). This and other functions are pre-programmed by the manufacturer and are "built-into" the microprocessor during construction. Alternatively microprocessors are available which may be "user-programmed" but, these are used generally only for prototype constructions and pre-programmed types are preferred for quantity production runs.

The matrix display information is divided into two groups, viz., row and column information on output lines indicated at 74 and 75 respectively. The row information for each character to be displayed is loaded through an integrated circuit driver 76 into respective row transistor drive circuits 77, 78, 79 and 80. Each of these circuits therefore has seven parallel stages connected to the scan control transistors 66 in each of the seven rows of the character matrix display. The corresponding column information is loaded via further integrated circuit drivers 81, 82 and 83 into column transistor drive circuits 84 and 85. Each of the circuits 84 and 85 has two groups of five scan control output stages corresponding to the columns of two display character matrices.

In operation of the circuit of FIG. 5 the module is initially programmed with a display location address, by means of the setting of switches 14, and is plugged into the socket at the corresponding location. The module then "listens" to the stream of multiplexed messages carried on the multiplexed highway 5, repeatedly synchronising the microprocessor clock with start of message bytes and sampling and checking the following address bytes. The system digital bit rate is 300 Hz and the microprocessor crystal oscillator operates at a fundamental frequency of 6 MHz. The crystal frequency is divided down as appropriate and each time a first bit edge of a start of message byte is detected the timing circuits are reset and a count lasting substantially half of one bit width is made at the end of which the microprocessor commences sampling received message bits at 300 Hz. Thus, each bit is sampled substantially at its centre, eliminating errors due to rising or falling bit edge waveforms. Also, the need for a central system clock is eliminated and the accumulated error over the period of one message is negligible.

Assuming that a message includes the module address the microprocessor continues sampling data at the same bit rate of 300 Hz. The information bits are then decoded and the row and column information appears at the microprocessor outputs 74 and 75 respectively at the same basic frequency. The column driver outputs are interlaced with the row scan driver outputs which also appear at a frequency of 300 Hz with a mark-to-space ratio of seven to one and mutually interlaced to provide a complete display scan at 300 Hz.

The display information memory 38 continues to store data relating to the last received message and thus, to change or clear the display a correctly addressed message containing either different information bytes or zero information bytes must be received and processed.

In a display system incorporating display modules according to the invention all modules are constructed identically utilising a standardised production format. The microprocessors are mass-produced and pre-programmed according to the message code to be employed and need no further programming before assembly. The address code for a module is provided only at the point of assembly into a display system and the method of address programming described above enables a module to be removed from one location to a different location and re-programmed with the appropriate new address.

In a further form of the invention the socket at each location, by means of which a module is connected to the multiplex data highway, includes an address hard-wired by appropriate connection of socket terminals to either a zero volt or five volt supply line. The module includes a circuit responsive to the voltages appearing on the corresponding plug pins, when the plug and socket are mated, which circuit is arranged to program the microprocessor with the hard-wired address code. Thus the module is automatically programmed with a location address upon connection and is automatically re-programmed upon removal to a different location.

The display modules are adapted to display numerals or letters. For example, as will be seen in FIGS. 2 and 3 the train code displayed therein is 1A27. Other characters could equally well be displayed, depending only upon the programming of the microprocessor and the accommodation of the chosen characters in the information code used in the multiplex transmission. In the particular system described the information code used is that known as ASCII code, and is well known and used in railway data transmission systems.

Having thus described our invention what we claim is:

1. An information display system comprising a mimic diagram having a plurality of locations for the selective display of information, each said location having a unique address code, multiplex data transmission means linking said locations to information supply means arranged to supply multiplexed messages consisting of an address code portion and a message portion, a connector socket mounted in the diagram at each said location, a plurality of interchangable standard plug-in display module assemblies each comprising a connector plug for mating with any one of the connector sockets, said plug being connected to address comparison means for, responsive to a correct address, gating a message information portion through information gating means to information decoding means connected to drive information display means, each module assembly further including an address programming means which is settable to provide the correct address to said comparison means corresponding to that allocated to the particular location at which the module assembly is plugged-in.

2. A display system as claimed in claim 1, wherein the address comparison and information gating means and the decoding means are constituted by a microprocessor.

3. A display system as claimed in claim 1 or claim 2 including a differential line receiving means for receiving transmitted messages in the form of differential line signals.

4. A display system according to claim 1 wherein the address programming means comprises a bank of switches arranged to be opened or closed according to a selected module location address.

5. A display system according to claim 1 wherein the address programming means comprises a circuit means responsive to a module location address hard-wired in a plug-in socket connector at a module location whereby the module is automatically programmed upon mating of the plug and socket.

6. A display system as claimed in claim 1 including scanning means for energizing the information display means.

7. A display system as claimed in claim 6 wherein the information display means comprises a scanned matrix of light emitting devices for each information character.

8. For use in a information display system comprising a mimic diagram having a plurality of locations for the selective display of information, each said location having a unique address code, multiplex data transmission means linking said locations to information supply means arranged to supply multiplexed messages consisting of an address code portion and a message portion, and a connector socket mounted in the diagram at each said location, a plug-in display module assembly comprising a standard connector plug for mating with any one of the connector sockets, and connected to said plug, address comparison means for, responsive to receiving a correct address, gating a message information portion through information gating means to information decoding means connected to drive information display means and an address programming means which is settable to provide a correct address for comparison corresponding to that allocated to the particular location into which the module assembly is plugged.

* * * * *